United States Patent [19]

Ushiro et al.

[11] Patent Number: 5,136,319
[45] Date of Patent: Aug. 4, 1992

[54] LENS-FITTED PHOTOGRAPHIC FILM PACKAGE

[75] Inventors: Seimei Ushiro; Hiroshi Ohmura; Tsutomu Tanaka, all of Tokyo, Japan

[73] Assignee: Fuji Photo Film Co., Ltd., Kanagawa, Japan

[21] Appl. No.: 658,664

[22] Filed: Feb. 21, 1991

[30] Foreign Application Priority Data

Feb. 21, 1990 [JP] Japan ..................... 2-16511
Feb. 21, 1990 [JP] Japan ..................... 2-16512

[51] Int. Cl.$^5$ .............................. G03B 35/08
[52] U.S. Cl. ..................... 354/114; 354/116; 354/212
[58] Field of Search ............... 354/110, 114, 115, 116, 354/203, 212–216

[56] References Cited

U.S. PATENT DOCUMENTS

| | | | |
|---|---|---|---|
| 3,895,867 | 7/1975 | Lo et al. | 354/115 |
| 4,687,310 | 8/1987 | Cuvillier | 354/115 |
| 4,812,866 | 3/1989 | Ushiro et al. | 354/202 |

Primary Examiner—L. T. Hix
Assistant Examiner—David M. Gray
Attorney, Agent, or Firm—Young & Thompson

[57] ABSTRACT

A lens-fitted photographic film package for steroscopic photography, wherein a plurality of images of the same subject are taken simultaneously through a corresponding number of taking lenses disposed horizontally side by side at a given distance from each other. Behind the respective taking lenses, exposure chambers and exposure frames for defining the respective exposure areas on the film surface are formed. The exposure frames are each gently curved, and a guide surface for supporting the rear surface of the film is curved complementarily to the exposure frames. Pressing members formed in the guide surface press the film against the end surfaces of walls separating the exposure frames, so as to curve the film along the exposure frames. The film is thus wavy, with forwardly concave film portions in the exposure frames alternating with rearwardly concave film portions between the exposure frames. The optical axes of the taking lenses are upwardly or downwardly offset from the center of the film surface, so that the space under or over the exposure frames can be utilized efficiently.

16 Claims, 7 Drawing Sheets

LENS-FITTED PHOTOGRAPHIC FILM PACKAGE

BACKGROUND OF THE INVENTION

The present invention relates to a lens-fitted photographic film package having a package body which is previously loaded with a photographic film and in which simple exposure mechanisms are incorporated. The lens-fitted photographic film package is hereinafter called simply a film package. The present invention relates especially to such a film package for stereoscopic photography.

Stereoscopic photography takes advantage of parallax and convergence of the optical axes of the left and right eyes for making a photographic image which appears as if it were three-dimensional. As a stereo camera for taking such stereoscopic photography, for example, a Nimslo stereo camera with four lenses (trademarked "NIMSLO 3D") is known. In the Nimslo stereo camera, four taking lenses are disposed horizontally side by side at a given distance from each other in the front of the camera body, and four picture frames are recorded simultaneously in the area corresponding to two full-size frames, whereby the four picture frames of a same subject are each approximately half of a 35 mm film frame in size, and have a uniform parallax relative to each other according to the given distance between the taking lenses. That is, a subject is taken from four slightly different points of view during each exposure. By printing a set of four picture frames on a photographic paper provided with a transparent lenticular sheet, such as is disclosed in U.S. Pat. No. 3,751,258, and by using four printing lenses which are optically equivalent to the four taking lenses of the stereo camera, a stereoscopic photograph is produced.

The above-described conventional four-lens type stereoscopic camera is large in size and expensive, because four picture frames are to be taken simultaneously in an area corresponding to two 35 mm full-size frames with the use of a specific exposure mechanism.

On the other hand, film packages are known worldwide which are previously loaded with a film and have simple exposure mechanisms such as a taking lens, a shutter, a film advancing mechanism and the like. The film package is a kind of single-use throwaway camera that makes it possible to take pictures at will without buying or carrying about an expensive and heavy camera. A single-use disposable camera must be cheap and light, so the film package must also be simple and compact in construction so as to minimize the cost and the weight thereof. For this reason, a single-element taking lens is incorporated in the film package.

Recently, the resolving power of taking lens and photographic film has been so remarkably improved that such a large (half-size) negative is not always necessary for printing a stereoscopic photograph of popular size (76 mm × 12 mm to 83 mm × 114 mm). Therefore, it may be possible and reasonable to provide a single-use film package that can take stereoscopic photographs. For this purpose, it is proposed to record two or three picture frames of small size, e.g. 12 mm × 18 mm, within an area corresponding to a 35 mm full-size frame.

However, in order to record small size frames in such a way, specific members such as specific exposure chambers for forming corresponding exposure light paths and exposure frames are necessary, which will increase the cost of the device. In addition to this, such small size frames can increase dead spaces in the film package. Not only is the provision of a plurality of taking lenses and a complex exposure mechanism for a stereoscopic camera disadvantageous from a standpoint of cost and size of the film package, but also the occurrence of dead spaces worsens the problem.

Because film packages of the type described use a single-element lens as the taking lens for lowering the cost, it is necessary to prevent picture images from being affected by the distortion that is inevitable when an optical image formed by a single-element lens is projected on a flat surface. To compensate for this distortion, conventional film packages are so constructed that the film surface is gently concavely curved in the exposure position.

Also in a stereo camera, it will be understood that a plurality of single-element taking lenses disposed horizontally side by side like the above-described Nimslo camera will form a plurality of images having different distortions if the film surface is planar. If a set of images taken at once by a stereo camera have different distortions, since the parallax among those images is variable, it is impossible to make a stereophotography by printing the set of images onto a photographic paper in the form of a lenticular sheet.

SUMMARY OF THE INVENTION

In view of the foregoing, one object of the invention is to provide a film package that can take a set of pictures from which a stereophotographic print using a lenticular sheet can be made.

Another object of the invention is to provide such a film package at a low cost.

A further object of the invention is to make the stereoscopic film package as compact as possible.

To achieve the above and other objects, the present invention provides a film package wherein a plurality of taking lenses are disposed horizontally side by side at a given distance from each other, and a plurality of exposure frames are disposed behind the taking lenses for defining the respective exposure areas through the taking lenses, and pressing members for gently pressing a loaded film from its rear side onto the exposure frames are disposed on the opposite side of the loaded film from boundary portions between the exposure frames so as to curve the film surfaces along the film advancing direction, so that the film is concave around the center of the respective exposure frames.

The above construction curves the film surfaces gently so that they are forwardly concave along the film advancing direction in the respective exposure frames. Therefore, even when the taking lenses are single-element taking lenses, the distortion of the respective optical images formed on the film surface by the taking lenses is remarkably reduced.

According to the invention, the optical axes of the taking lenses are displaced upward or downward from the center of the loaded film, so that the exposure chambers are disposed upward or downward from the center of the film package body. In this way, there is provided a blank under or over the exposure chambers, in which elements such as electrical units for driving a flash can be accommodated, thereby reducing dead spaces in the film package. Therefore, the stereoscopic film package of the invention can be made compact and small at a low cost.

BRIEF DESCRIPTION OF THE DRAWINGS

Other objects and advantages of the invention will become apparent from the following description taken in conjunction with preferred embodiments with reference to the accompanying drawings, in which the same or like parts are designated by the same reference numerals throughout the drawings.

DETAILED DESCRIPTION OF THE PREFERRED EMBODIMENTS

Figure 1:
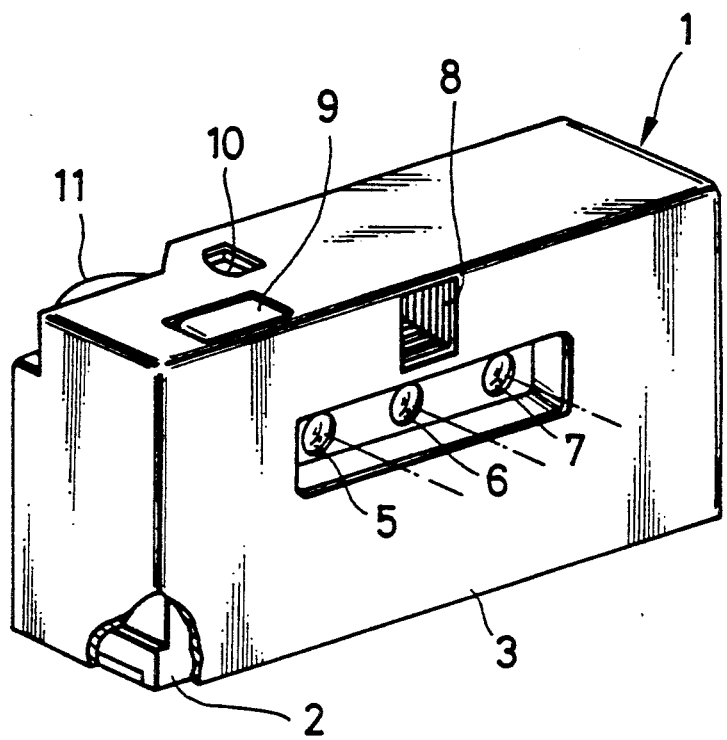
FIG. 1 is a perspective view showing the outer appearance of a film package according to a first embodiment of the invention.

FIG. 1 shows the outer appearance of a film package for stereoscopic photography according to a first embodiment of the present invention. The film package 1 comprises a package body 2 and an outer casing 3 encasing the package body 2. In the package body there are provided simple exposure mechanisms such as three taking lenses 5 to 7, a viewfinder 8, a release button 9, a counter window 10, a film advancing wheel 11, and so forth. The outer casing 3 is made of cardboard or the like, is printed thereon with decorative patterns and characters, and is formed with openings for exposing the exposure mechanisms incorporated in the package body.

Figure 2:
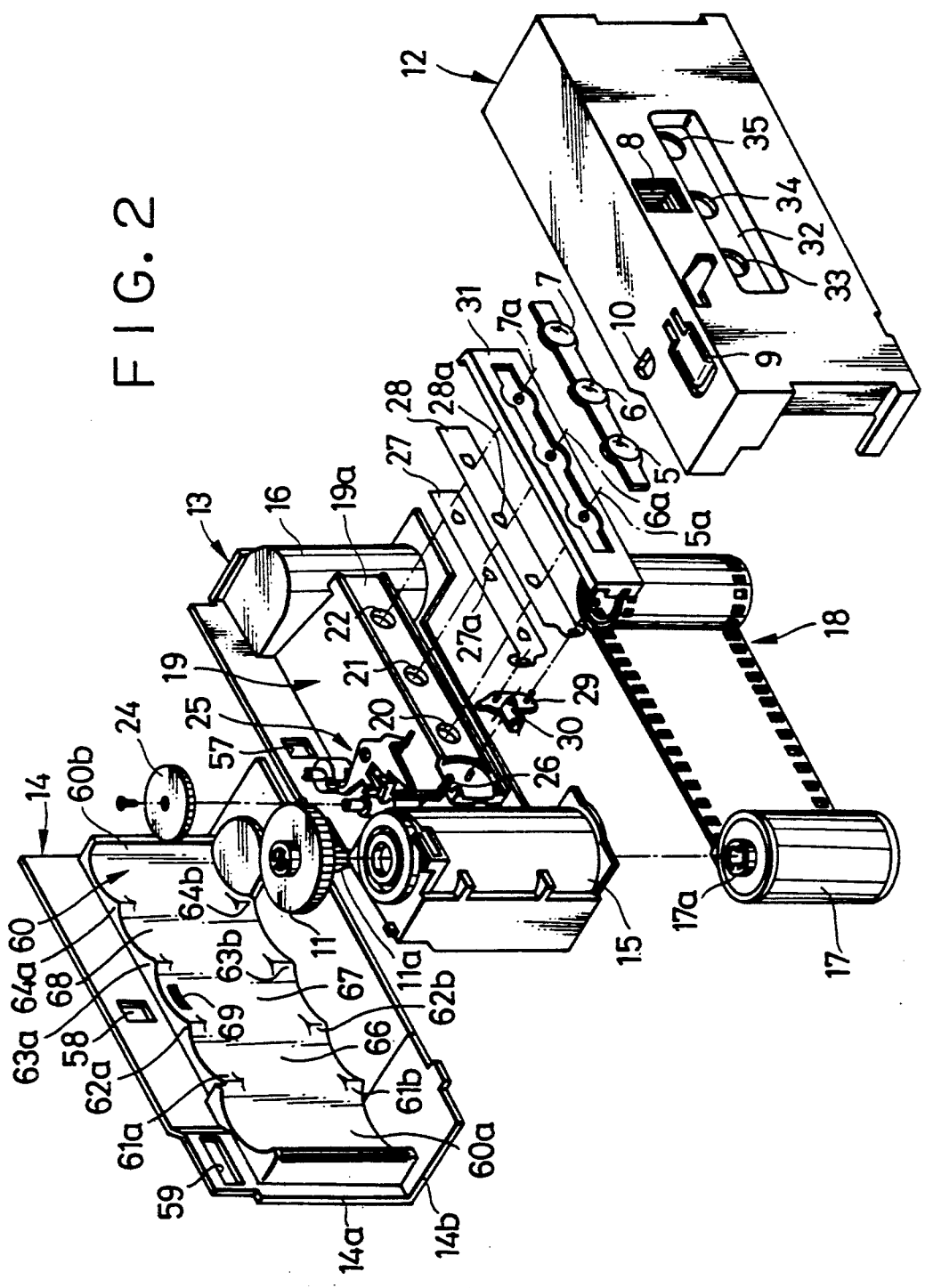
FIG. 2 is an exploded view of the package of the first embodiment.

The package body 2 is previously loaded with a 35 mm roll film. As shown in FIG. 2, the package body 2 comprises a front cover section 12, a main body section 13 and rear cover section 14 each of which is formed as one piece of light-tight rigid synthetic resin. The main body section 13 is formed with a semi-cylindrical film container chamber 15 and a semi-cylindrical film roll chamber 16 on the left and right sides thereof. The film container chamber holds a film container 17 with a spool 17a, whereas the film roller chamber 16 holds a roll of unexposed film 18, a 35 mm film for instance, which has been pulled out in the factory from the film container 17 and wound into roll of film 18. One end of the film 18 is attached to the spool 17a. Between the film container chamber 15 and the film roll chamber 16, there is formed an exposure station 19. In the front surface 19a of the exposure station 19, three exposure apertures 20 to 22 are disposed horizontally side by side corresponding to the taking lens 5 to 7, as is describe in detail below.

The film advancing wheel 11 with knurling on its periphery is mounted on the top of the film container chamber 15 such that a winding shaft 11a of the film advancing wheel 11 projects into the film container chamber 15 and engages with a spool 17a of the film container 17. By rotating the film advancing wheel 17, the spool 17a is rotated to wind the film 18 back into the film container 17, frame by frame, as the film is progressively exposed. While the film 18 is advanced, a sprocket wheel 23 whose teeth engage in perforations of the film 18 (FIG. 5) is rotated according to the movement of the film 18, so that the advanced length of film 18 is detected. The sprocket wheel 23 rotates one revolution for each film advance by three pictures frames. One revolution of the sprocket wheel 23 moves a frame counter disc 24 by one step and, at the same time, actuates a self-cocking mechanism 25 to lock the film advancing wheel 17. The selfcocking mechanism 25 also sets a shutter actuating lever 26 in its cocked position while locking the film advancing wheel 17.

In front of the exposure apertures 20 to 22, shutter blades 27 and 28 are disposed parallel to the front surface 19a of the exposure station 19. The shutter blades 27 and 28 are slidable horizontally along the front surface of the exposure station 19a. The shutter blades 27 and 28 are each formed with three openings 27a, 28a, respectively, and are connected to a connecting lever 29 which is urged by a spring 30 to rotate counterclockwise. The shutter blades 27 and 28 close the exposure apertures 20 to 22 in their rest position. When the release button 9 is depressed, the shutter actuating lever 26 is uncocked to hit the connecting lever 29, thereby rotating the connecting lever 29 clockwise. As the result, the shutter blades 27 and 28 slide in opposite directions and superpose the openings 27a and 28a simultaneously on the exposure apertures 20 to 22, thereby opening the exposure apertures 20 to 22 for the exposure time.

Forward of the shutter blade 28, a lens board 31 for supporting the taking lenses 5 to 7 is mounted. When the front cover section 12 is assembled to the main body section 13 after the taking lenses 5 to 7 are fitted into the lens board 31, then the taking lenses 5 to 7 are held in a position wherein the optical axes 5a to 7a of the taking lenses 5 to 7 coincide with the center of the exposure apertures 20 to 22, respectively. The taking lenses 5 to 7 are each a single-element lens, and are formed integrally as one piece of rigid synthetic resin. Because it is necessary to take simultaneously three images of the same subject on the 35 mm film 18, the size of a picture frame must be small for keeping the film package small and compact. In this embodiment, the size of a picture frame is about 18 mm×12 mm, and three pictures are recorded within an area corresponding to a full-size frame (24 mm×36 mm) of a 35 mm film. But it is possible to define the size of a picture frame 24 mm×18 mm or other and to record at once three picture frames in an area corresponding to one and a half frames of 35 mm film. In any case, because of such a small picture frame, the focal length of the taking lenses 5 to 7 is shorter than that used in conventional film packages, 35 mm for instance. The front cover section 12 has at its center a horizontally elongated recessed portion 32, in whose recessed surface there are formed three openings 33, 34 and 35 for exposing the taking lenses 5 to 7, respectively. The recessed portion 32 is provided to adapt the distance between the taking lenses and the film surface to the shorter focal length.

Figure 3:
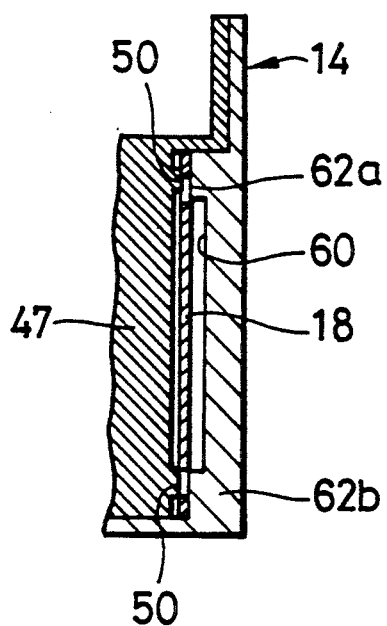
FIG. 3 is a fragmentary vertical sectional view, with portions broken away for clarity, of the film package of FIG. 1.
Figure 4:
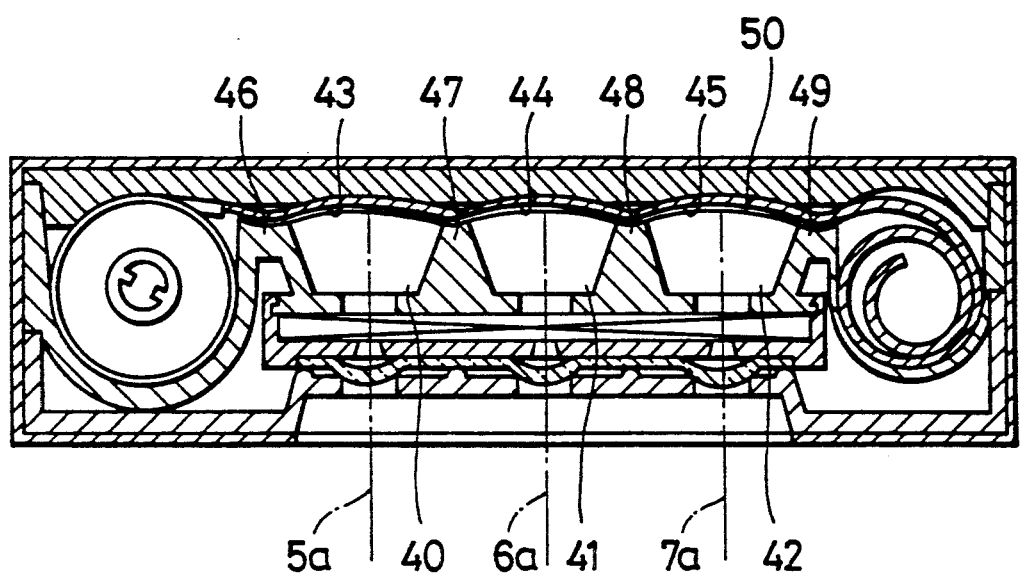
FIG. 4 is a cross-sectional view of the film package of FIG. 1 in the plane of the optical axes of the taking lenses.
Figure 5:
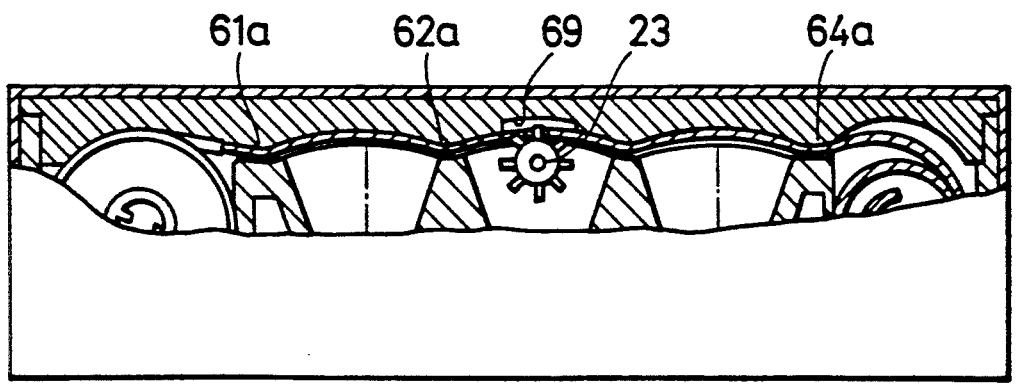
FIG. 5 is a fragmentary cross-sectional view of the film package of FIG. 1 in a horizontal plane near the top wall of the film package.

Referring to FIG. 4 showing the interior of the exposure station 19, there are three exposure chambers 40 to 42, in whose open ends three exposure frames 43 to 45 each defining a picture frame are formed. The exposure frames 43 to 45 are gently curved along the film transporting direction such that the end surfaces of walls 46 to 49 separating the exposure chambers 40 to 42 are rearwardly concave, whereas the open end surface of the exposure chambers 40 to 42, that is, the areas around the respective optical axes 5a to 7a are rearwardly convex. On upper and lower sides of the exposure frames 43 to 45, upper and lower film supporting tracks 50 are provided along the film advancing direction that support both edge portions of the film 18 so as to reduce the film tension required to transport the film 18, as is shown in FIG. 3, which is a vertical section taken along the separating wall 47. It is to be noted that FIGS. 4 and 5 show a horizontal section of the film package except for the film container 17.

The rear cover section 14 comprises a rear wall 14a and a bottom wall 14b arranged to form an approximately L-shape body. The rear wall 14a is formed with a look-in window 58 of the viewfinder 8, an opening 59 through which the film advancing wheel 11 projects, and a film guide surface 60. It is to be noted that the main body section 13 has an opening 57 corresponding to the look-in window 58 of the rear cover section 14.

Left and right side portions 60a and 60b of the film guide surface 60 form a part of the inner surfaces of the film container chamber 15 and the film roll chamber 16, respectively. At the upper and lower regions of the film guide surface 60, four pairs of projections 61a, 61b; 62a, 62b; 63a, 63b; and 64a, 64b are provided which are so arranged as to face the end surfaces of the separating walls 46 to 49, respectively, when the rear cover section 14 is assembled to the main body section 13. Between each adjacent two of these projection pairs, there are provided curved back-up surfaces 66 to 68 which are gently concave complimentarily to the convex open end surfaces of the exposure chambers 40 to 42. In this way, when the rear cover section 14 is assembled to the main body section 13, there is formed a wavy film passageway between the film guide surface 60 and the exposure frames 42 to 45.

The back-up surfaces 66 to 68 contact the base surface of the film 18 extending between the film roll chamber 16 and the film container chamber 15, while the projection pairs press the film 18 at both its edge portions against the supporting tracks 50 on the end surfaces of the separating walls 46 to 49, as is shown in FIG. 3, thereby holding the film 18 in cooperation with the supporting tracks 50.

The middle back-up surface 67 is further formed at its upper portion with a slot 69 for receiving the teeth of the sprocket wheel 23, so that the sprocket wheel 23 can rotate without interfering with the back-up surface 67, as is shown in FIG. 5. In view of the fact that the film 18 is under tension, especially in the middle exposure chamber 41, positioning of the sprocket wheel 23 at the upper portion of the middle film back-up surface 67 is preferable, because the sprocket wheel 23 presses the film 18 against the horizontally convexly curved surface 67 and thus helps to curve the film 18 along the surface 67.

By curving the film portions rearwardly so that they are forwardly concave in the respective exposure frames 43 to 45, images formed on the horizontally curved film surfaces are prevented from having the horizontal distortion that would otherwise be produced by the single element taking lenses 5 to 7.

Because not only the supporting tracks 50 but also the projection pairs reduce the contact surface of the film 18, the friction during transporting the film is reduced, so that the tension during film transport will not unduly increase even when following the wavy path shown in FIG. 4. Furthermore, as the image recording surface of the film will contact neither the back-up surfaces 66 to 68 nor the film supporting tracks 50, abrasion of the image recording surface is prevented.

The rear and front cover sections and the main body section are fitted to each other after being loaded with the film 18 in the above-described manner. It is preferable to fix these sections together by ultrasonic welding or the like, so that the user may not load a new film into the film package 1 after taking pictures with using the previously loaded film.

The film package described above is operated as follows:

Upon depression of the release button 9, the shutter actuating lever 26 causes the connecting lever 29 to rotate clockwise, so that the shutter blades 27 and 28 slide in opposite directions, thereby opening the exposure apertures 20 to 22. When the exposure apertures 20 to 22 are opened, light from a subject travels through the taking lenses 5 to 7 to reach the film 18, so that three latent images of the subject are recorded on three portions of the film 18 bounded by the exposure frames 43 to 45. The three latent images have a given parallax relative to each other according to the given distance between the taking lenses.

Because the film 18 is curved along the exposure frames 43 to 45, horizontal distortion of the optical images formed by the single-element taking lenses 5 to 7 is compensated. As a result, the latent images are not distorted.

When all frames have been exposed, the exposed film 18 has been rewound into the film container 17. The package is opened in the light to remove the film container 17 containing the exposed film and the container 17 is then opened in a darkroom and the exposed film 18 is developed to convert the latent images into negative images, and a set of three negative images of the same subject are superimposed as a composite single image onto a photographic paper provided with a transparent lenticular sheet. Upon developing the photographic paper with the lenticular sheet, a stereoscopic photograph is produced.

Figure 6:
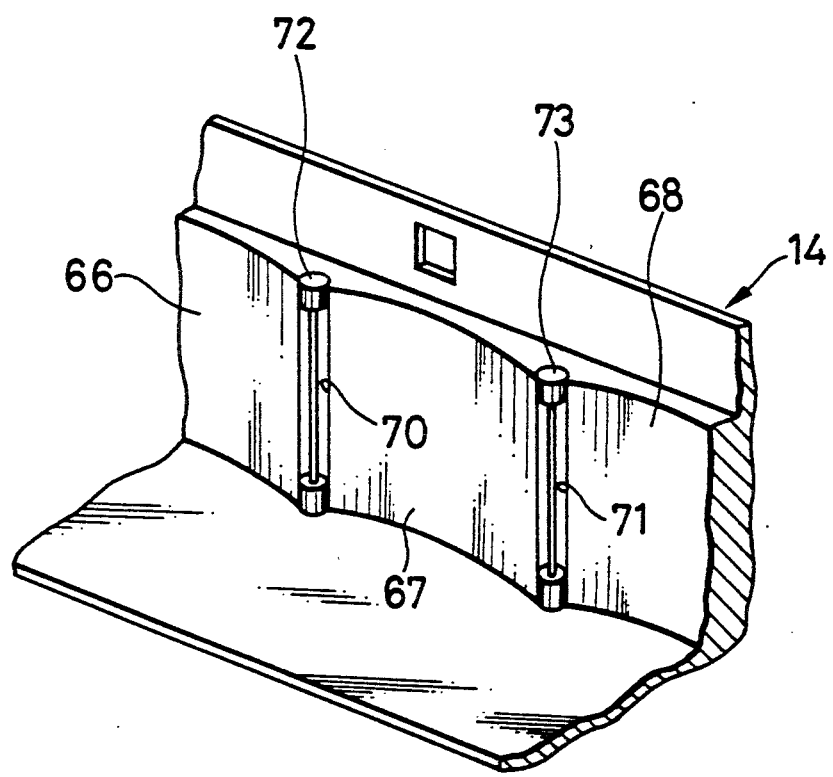
FIG. 6 is a fragmentary perspective view showing a rear case section, with portions broken away for clarity, of a film package according to a second embodiment of the invention.

FIG. 6 shows a second embodiment of the invention wherein semi-cylindrical grooves 70 and 71 extend vertically between the two adjacent film back-up surfaces 66 and 67 on the one hand and 67 and 68 on the other hand, and rotatable guide rollers 72 and 73 are mounted in the grooves 70 and 71. Each guide roller 72 and 73 comprise a pair of rollers disposed at opposite ends of the grooves 70 and 71, connected to each other with a shaft. The diameter of the rollers is such that the peripheries of the rollers project from the grooves 70 and 71, and press a transported film at its upper and lower edge portions onto the facing surfaces of the separating walls 47 and 48. As a result, the same effect as the above-described projections 62a, 62b and 63a, 63b of the first embodiment is achieved by the second embodiment. The second embodiment is even more effective for reducing the tension required to wind the film back into the film container than is the first embodiment.

Figure 7:
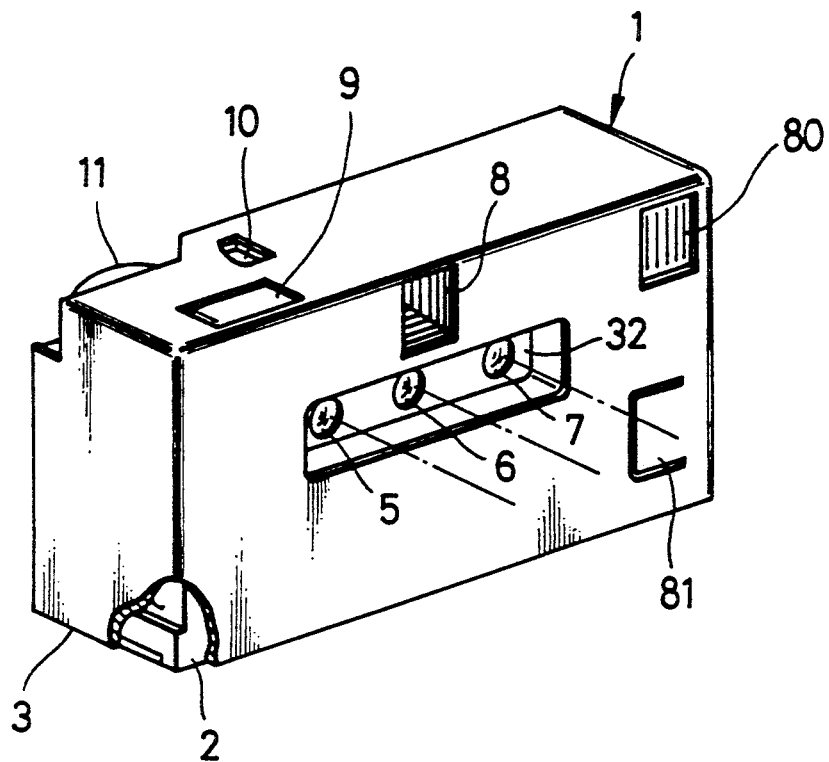
FIG. 7 is a perspective view of a film package according to a third embodiment of the invention.
Figure 8:
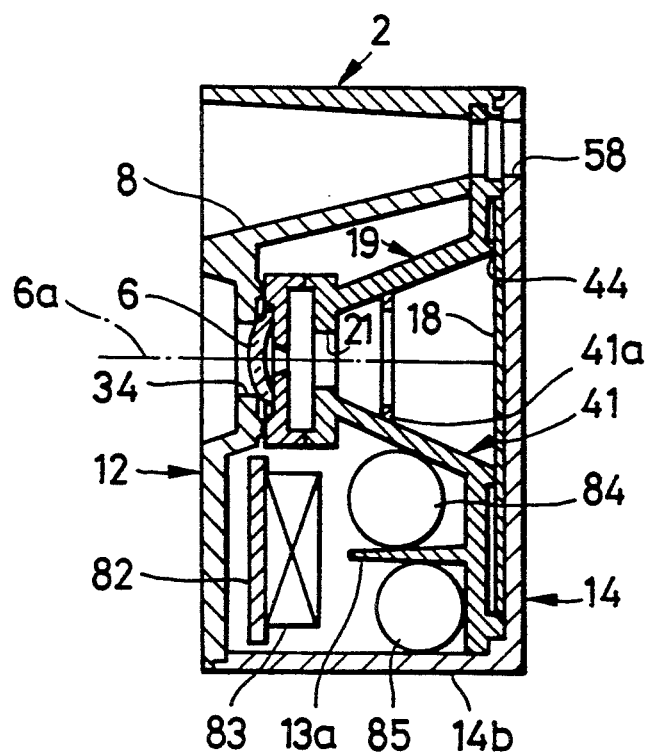
FIG. 8 is a vertical sectional view of the film package of FIG. 7.
Figure 9:
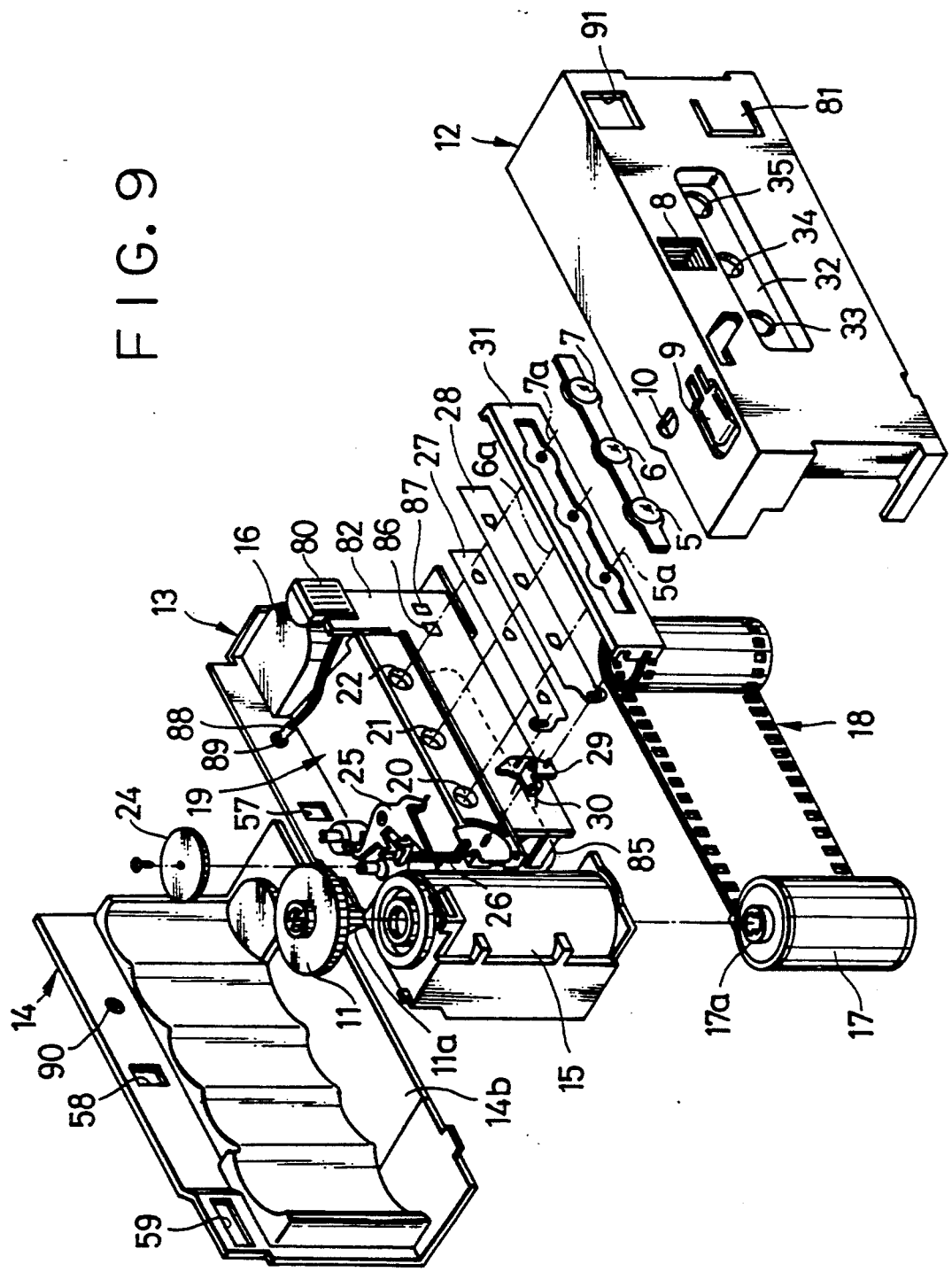
FIG. 9 is an exploded view of the package of the third embodiment.

FIGS. 7 to 9 show a third embodiment of the invention wherein also a flash unit is incorporated in a film package for stereoscopic photography. The same or like parts are designated by the same reference numerals as in the first embodiment, so that the description of the same or like parts can be omitted.

In FIG. 7, the film package 1 according to the third embodiment has a light emitting member 80 of a flash unit and a charge switch 81 for the flash unit which are disposed on the upper and lower right portions of the front of the film package, respectively. An outer casing 3 is formed with an opening for exposing the light emitting member 80 of the flash unit and a slit corresponding to the charge switch 81 for the flash unit.

FIG. 8 shows the interior of the film package as a section taken in a vertical plane including the optical axis 6a of the middle taking lens 6. Also in this embodiment, the exposure station 19 is sectioned into three exposure chambers corresponding to the three taking lenses 5 to 7. As can be seen from FIG. 8, the optical axis 6a is displaced upward from the center of the film surface 18, and an exposure frame 44 of a middle exposure chamber 41 is so arranged that the center of the exposure frame 44 coincides with the optical axis 6a. The size of the exposure frame 44 is, for example, about 18 mm×12 mm (which in practice will be slightly smaller by the thickness of the separating walls between the exposure chambers). A light-trapping frame 41a for preventing flare is provided between an exposure aperture 21 and the exposure frame 44. Both of the side exposure chambers are constructed in the same way as the middle exposure chamber 44.

Because the exposure chambers are upwardly offset in this way, there is provided a rather large space between the exposure chambers and the bottom wall 14b of the package body 2. Therefore, it becomes possible to dispose in this space a printed circuit board 82 with a flash driving circuit 83 mounted thereon, a capacitor 84 and a battery 85 for the flash unit. In order to receive the capacitor 84 and the battery 85 in a stable fashion, a separating plate 13a is provided under the exposure station 19, this separating plate being formed integrally with the main body section 13.

As shown in FIG. 9, the printed circuit board 82 has a pair of printed electrodes 86 and 87 on its printed surface. When the charge switch 81 is depressed, a not shown metal plate disposed on the inner surface of the charge switch 81 contacts both electrodes 86 and 87, thereby electrically connecting the electrodes with each other. This short-circuiting of the electrodes 86 and 87 activates the flash drive circuit 83 to charge the capacitor 84. When the capacitor 84 has been fully charged, an LED 88 begins to emit light. Openings 89 and 90 for observing the LED 88 are formed in the main body and rear cover sections 13 and 14, respectively. A rectangular opening 91 formed in the front cover section 12 functions as a flash window into which the light emitting member 80 is fitted.

According to this third embodiment, as in the second embodiment, the optical axes of the taking lenses and thus the exposure chambers are upwardly offset, and so the space under the exposure chambers can be used to receive the necessary elements of the flash unit except the light emitting member 80, so that it is unnecessary to position the capacitor 84 on the opposite side of the film roll chamber 16 from the exposure station 19. As the result, the length of the package body 2 is reduced, so that the film package 1 is made small and compact, and thus the cost of material is reduced, which contributes to the production of the film package 1 at a low cost.

Figure 10:
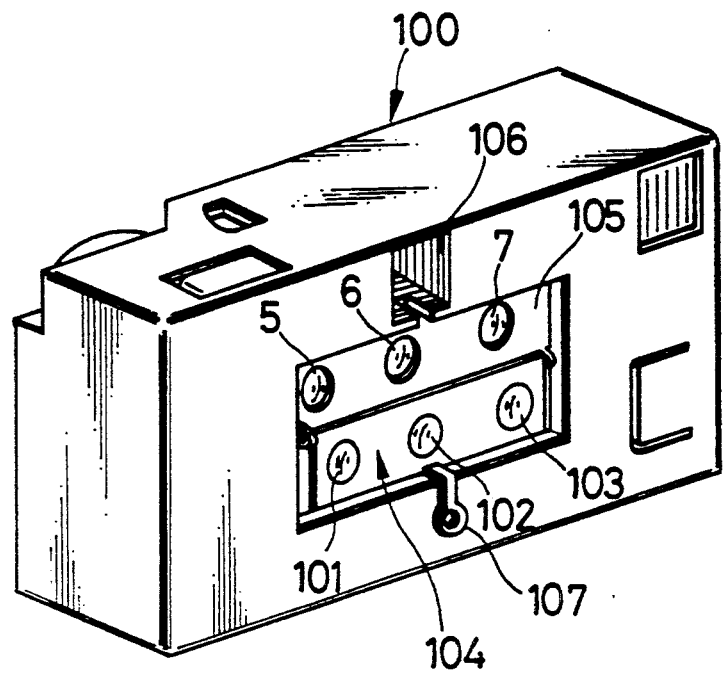
FIG. 10 is a perspective view of a film package according to a fourth embodiment of the invention.

Referring now to FIG. 10 showing a fourth embodiment of the invention, a film package 100 is further provided with three conversion lenses 101, 102 and 103 which are held in a lens holder 104. The lens holder 104 is pivotally mounted on a recessed surface 105 in the front of the film package 100 such that, when the lens holder 104 is turned up to contact the upper half of the front surface of the recessed portion 105, the optical axes of the conversion lenses 101 to 103 coincide with the optical axes of three taking lenses 5 to 7, respectively. Simultaneously, a target mark 107 formed integrally with the lens holder 104 is inserted in a viewfinder 106. In this condition, the film package 100 functions as a telephotography or macro-photography camera. The other structure of this embodiment is similar to that of the third embodiment.

The target mark 107 is bent in a manner as shown in FIG. 10. Thus the free end of the target mark 107 can be caught by a fingernail to raise the target mark 107. Thereafter, the target mark 107 can be easily held between the fingers, so as to swing up the lens holder 104 to position the conversion lenses 101 to 103 before the taking lenses 5 to 7. Consequently, changing-over between standard photography and tele- or macro-photography is very easy. This fourth embodiment thus makes it easy to take stereoscopic telephotographs or stereoscopic macro-photographs.

Figure 11:
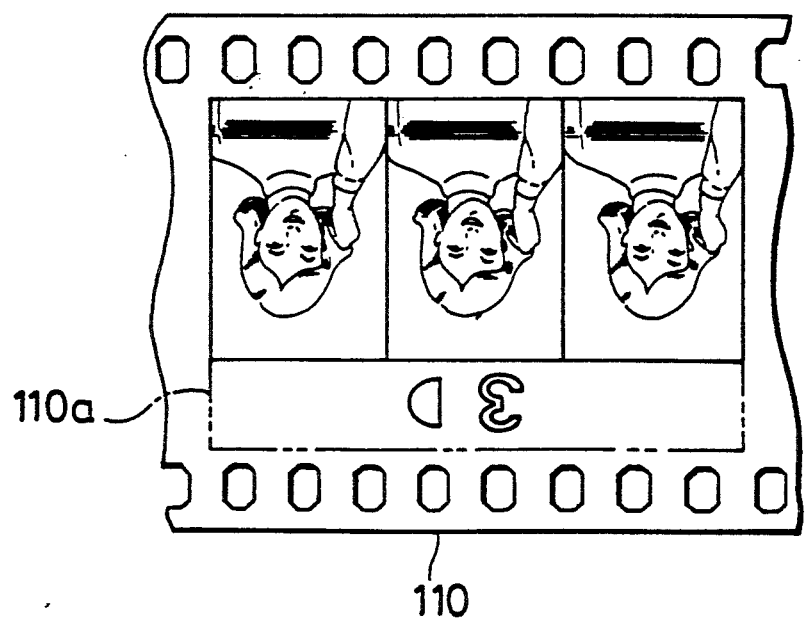
FIG. 11 is a plan view showing a part of photographic film exposed by means of a film package according to a fifth embodiment of the invention.

FIG. 11 shows a part of a photographic film 110, e.g. a 35 mm film, exposed by a fifth embodiment of the invention wherein the optical axes of three taking lenses are also upwardly offset from the center of the film surface. As can be seen, three images of the same subject are recorded within a full-size frame area 110a of the film 110. Furthermore, a mark "3D" is recorded below the middle image within the area 110a, in order to indicate that the three images are to be printed as a single stereoscopic photograph. For recording the mark "3D", the exposure chambers are enlarged such that the tapered bottom wall thereof extends toward the lower edge portion of the film 110, and a light-shielding plate punched with a character "3D" is mounted in the lower area of the open end surface of the exposure chambers. Therefore, the bottom margin of the exposure frame is defined by the top edge of the light-shielding plate. Of course, it is possible to define the size of a frame differently if only the central image of the frame is upwardly offset from the center of the film surface. The other structure is substantially the same as in the above embodiments.

Because the mark "3D" clearly indicates that three negative images are to be printed as a single stereoscopic photograph, it becomes easy to distinguish the film 110 of the developed stereoscopic film package from other films, so that this fifth embodiment contributes to improving the efficiency of printing, as well as to preventing mistakes.

Panoramic picture frames recorded by a panoramic camera which has been sold in the U.S.A. and Japan by Eastman Kodak since 1989, cover a narrower area of the film than standard frames, as do the picture frames recorded by the film package according to the third to fifth embodiments of the present invention, but the frames for stereoscopic photography of the present invention are easily distinguishable from the Kodak panoramic frames, because at least the central one of the frames of these embodiments is offset from the center of the film surface. Therefore, there is no possibility of misprinting with the present invention.

The invention has been described in detail with particular reference to preferred embodiments, but it will be understood that various modifications can be effected within the spirit and scope of the invention as claimed in the appended claims. For example, it is possible to displace the optical axes of the taking lenses downward from the center of the film surface. It may be possible to provide a plural number of taking lenses other than three, such as two, four or more taking lenses. Each taking lens may be a compound lens instead of a single-element lens.

Although the film preloaded in the above-described film packages is pulled out from the film container and wound in a roll at the factory, and a set of exposed frames, e.g. three mini-frames, are rewound into the container after each exposure, it may be possible manually to prewind the film from the container prior to the first exposure. It is also possible to wind up the film by a predetermined length after each exposure by progressively pulling it from the container and to rewind it into the container after the exposure of all frames, as in conventional cameras. Alternatively, the film roll chamber may receive a container containing a roll of film, and the exposed film portion can then be wound into another container disposed in the film container chamber.

The film package of the invention may be used not only for stereoscopic photography but also to take at once a plurality of photographs of the same subject, e.g. for identification cards or the like. Of course, the present invention is applicable not only to a film package but also to a compact camera or the like.

What is claimed is:

1. A lens-fitted photographic film package wherein a photographic film and exposure mechanisms for exposing said film are incorporated in said package, said lens-fitted photographic film package also comprising:
   at least two taking lenses disposed horizontally side by side in a front portion of said package;
   at least two exposure frame each for defining an exposure area of said film, said exposure frames being disposed respectively behind said taking lenses;
   guide means for guiding said film therealong, said guide means being curved along a film advancing direction so as to form a forwardly concave film surface within each said exposure frame and rearwardly concave film surfaces between said exposure frames; and
   pressing means for pressing said film from its rear surface against boundary portions between said exposure frames;
   said guide means having rearwardly concave film guiding surfaces thereon between said exposure frames and a film cartridge chamber.

2. A lens-fitted photographic film package as defined in claim 1, wherein said taking lenses are single-element lens means.

3. A lens-fitted photographic film package as defined in claim 2, wherein said taking lenses are formed integrally as one body by plastic resin molding.

4. A lens-fitted photographic film package as defined in claim 1, wherein said package has front, middle and rear case sections, and said exposure frames are formed in said middle case section integrally therewith.

5. A lens-fitted photographic film package as defined in claim 4, wherein said guide means include a pair of guide tracks extending through top and bottom margins of said exposure frames and a guide surface formed in said rear case section, said guide tracks and said guide surface being curved complimentarily to each other along the film advancing direction.

6. A lens-fitted photographic film package as defined in claim 5, wherein said pressing means includes a sprocket wheel engaging in perforations formed in an edge portion of said film and pressing the film against said guide surface.

7. A lens-fitted photographic film package as defined in claim 1, wherein said film is a 35 mm film and each said exposure area defined by said exposure frames is not larger than half of a frame of said 35 mm film.

8. A lens-fitted photographic film package wherein a photographic film having spaced parallel longitudinal edges and exposure mechanisms for exposing said film are incorporated in said package, said lens-fitted photographic film package also comprising:
   a plurality of taking lenses for making simultaneously a plurality of exposures arranged side by side in the film advancing direction, optical axes of said taking lenses being vertically offset from a central portion of said film that is midway between said longitudinal edges.

9. A lens-fitted photographic film package as defined in claim 8, wherein said optical axes of said taking lenses are downwardly offset from central portion of said film.

10. A lens-fitted photographic film package as defined in claim 8, wherein said optical axes of said taking lenses are upwardly offset from central portion of said film.

11. A lens-fitted photographic film package as defined in claim 10, further comprising a flash unit, and electrical elements for said flash unit disposed in a space under said optical axes of said taking lenses inside said package.

12. A lens-fitted photographic film package as defined in claim 10, further comprising conversion lenses for macro- or tele-photography, said conversion lenses being pivotally mounted on the front of said package below said taking lenses and being movable in front of said taking lenses.

13. A lens-fitted photographic film package as defined in claim 10, further comprising means for recording on said film beside said exposure areas information about said exposure areas, said recording means being disposed under said exposure frames and in front of said film.

14. A lens-fitted photographic film package as defined in claim 13, wherein said recording means record an index mark on said film for each set of exposure areas that are simultaneously exposed through said taking lenses.

15. A lens-fitted photographic film package wherein a photographic film and exposure mechanisms for exposing said film are incorporated in said package, said lens-fitted photographic film package also comprising:
   at least two taking lenses disposed horizontally side by side in a front portion of said package;
   at least two exposure frames each for defining an exposure area of said film, said exposure frames being disposed respectively behind said taking lenses;

guide means for guiding said film therealong, said guide means being curved along a film advancing direction so as to form a forwardly concave film surface within each said exposure frame;

pressing means for pressing said film from its rear surface against boundary portions between said exposure frames;

wherein said package has front, middle and rear case sections, and said exposure frames are formed in said middle case section integrally therewith;

wherein said guide means include a pair of guide tracks extending through top and bottom margins of said exposure frames and a guide surface formed in said rear case section, said guide tracks and said guide surface being curved complimentarily to each other along the film advancing direction; and wherein said pressing means include a pair of projections disposed on upper and lower sides of said guide surface and pressing said film at both its edge portions against said tracks.

16. A lens-fitted photographic film package wherein a photographic film and exposure mechanisms for exposing said film are incorporated in said package, said lens-fitted photographic film package also comprising:

at least two taking lenses disposed horizontally side by side in a front portion of said package;

at least two exposure frames each for defining an exposure area of said film, said exposure frames being disposed respectively behind said taking lenses;

guide means for guiding said film therealong, said guide means being curved along a film advancing direction so as to form a forwardly concave film surface within each said exposure frame;

pressing means for pressing said film from its rear surface against boundary portions between said exposure frames;

wherein said package has front, middle and rear case sections, and said exposure frames are formed in said middle case section integrally therewith;

wherein said guide means include a pair of guide tracks extending through top and bottom margins of said exposure frames and a guide surface formed in said rear case section, said guide tracks and said guide surface being curved complimentarily to each other along the film advancing direction; and wherein said pressing means includes a pair of rollers disposed in upper and lower sides of said guide surface and pressing said film at both its edge portions against said tracks.

* * * * *